(12) United States Patent
Cheng et al.

(10) Patent No.: US 10,678,085 B2
(45) Date of Patent: Jun. 9, 2020

(54) DISPLAY PANEL AND DISPLAY DEVICE

(71) Applicant: BOE Technology Group Co., Ltd., Beijing (CN)

(72) Inventors: Hongfei Cheng, Beijing (CN); Jianbo Xian, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 15/909,271

(22) Filed: Mar. 1, 2018

(65) Prior Publication Data

US 2019/0041687 A1 Feb. 7, 2019

(30) Foreign Application Priority Data

Aug. 2, 2017 (CN) .................. 2017 2 0957184 U

(51) Int. Cl.
*G02F 1/1335* (2006.01)
*G02F 1/1362* (2006.01)
*G02F 1/1339* (2006.01)

(52) U.S. Cl.
CPC ...... *G02F 1/133512* (2013.01); *G02F 1/1339* (2013.01); *G02F 1/133514* (2013.01); *G02F 1/136204* (2013.01); *G02F 2202/22* (2013.01)

(58) Field of Classification Search
CPC ............ G02F 1/136204; G02F 1/1339; G02F 1/133514; G02F 1/133512; G02F 2202/22
See application file for complete search history.

(56) References Cited

U.S. PATENT DOCUMENTS

| | | | |
|---|---|---|---|
| 2017/0139263 A1* | 5/2017 | Jin | G02F 1/133512 |
| 2019/0129262 A1* | 5/2019 | Yu | G02F 1/136209 |

* cited by examiner

*Primary Examiner* — Jessica M Merlin
(74) *Attorney, Agent, or Firm* — Arent Fox LLP; Michael Fainberg

(57) ABSTRACT

The disclosure relates to the technical field of displaying, and discloses a display panel and a display device. The display panel according to the present disclosure is divided into a display area and a peripheral area surrounding the display area, the display panel includes: a first substrate and a second substrate connected by a sealant, wherein the sealant is in the peripheral area; and a black matrix layer located between the first substrate and the second substrate, wherein a part of the black matrix layer in the peripheral area is provided with an opening for blocking static electricity, and the opening is located at an outer side of the sealant.

16 Claims, 3 Drawing Sheets

DISPLAY PANEL AND DISPLAY DEVICE

CROSS-REFERENCE TO RELATED APPLICATIONS

This application claims the priority to Chinese Patent Application No. 201720957184.X, filed on Aug. 2, 2017, the content of which is hereby incorporated by reference in its entirety.

FIELD

The disclosure relates to the technical field of displaying, and discloses a display panel and a display device.

BACKGROUND

As the most extensively used display technology at present, the liquid crystal display technology has been widely used in televisions, mobile phones and public information display. A liquid crystal screen includes an array substrate and a opposite substrate, the array substrate includes a thin film transistor array circuit driving liquid crystal display and pixel electrodes connected with the thin film transistor array circuit, the opposite substrate and the array substrate are opposite to each other to form the liquid crystal screen, and the liquid crystal materials are sealed between the array substrate and the opposite substrate.

ESD (Electro-Static discharge) is one of the major factors influencing the manufacturing yield of electronic products. In the electronic products, static electricity can be generated in many ways, for example, static electricity can be generated via contact, friction and induction between devices. When the static electricity in the electronic products is accumulated to a certain extent, electro-static discharge occurs, thereby leading to electro-static damage. The electro-static damage caused by ESD on the electronic products includes sudden damage and potential damage. Sudden damage refers to such damage during which the devices are seriously damaged with a loss of functions; and such damage can usually be found out in the quality detection step in the production process of electronic products. Potential damage refers to such damage during which the devices are lightly damaged with the functions being not lost; and such damage is not easily discovered in the quality detection step in the production process of electronic products, however, in the use process of the electronic products, such damage may enable the performance of the electronic products to be instable, and shorten the service life.

SUMMARY

The present disclosure provides a display panel, wherein the display panel is divided into a display area and a peripheral area surrounding the display area, and the display panel includes: a first substrate and a second substrate connected by a sealant, where the sealant is in the peripheral area; a black matrix layer located between the first substrate and the second substrate, where a part of the black matrix layer in the peripheral area is provided with an opening for blocking static electricity, and the opening is located at an outer side of the sealant.

The present disclosure further provides a display device which includes the display panel of any of the above display panel.

DETAILED DESCRIPTION OF THE EMBODIMENTS

A clear and complete description will be given below on the technical solutions of the embodiments in the present disclosure in combination with the accompanying drawings of the embodiments of the present disclosure, and apparently the embodiments described below are only a part but not all of the embodiments of the present disclosure. Based upon the embodiments of the present disclosure, all the other embodiments which can occur to those skilled in the art without any inventive effort shall all fall into the protection scope of the present disclosure.

Figure 1:
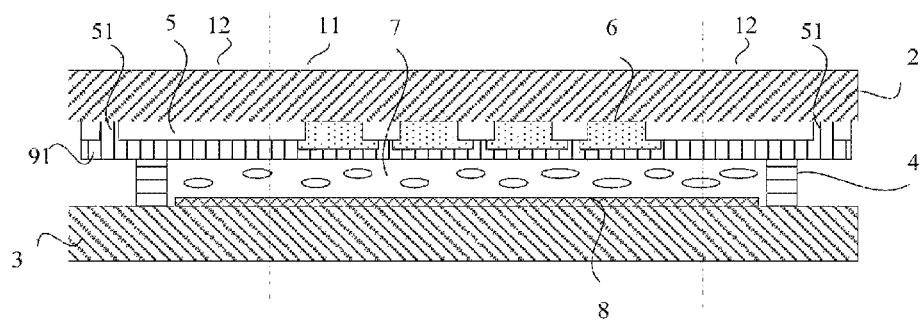
FIG. 1 is a sectional schematic diagram of a first display panel according to an embodiment of the present disclosure.
Figure 2:
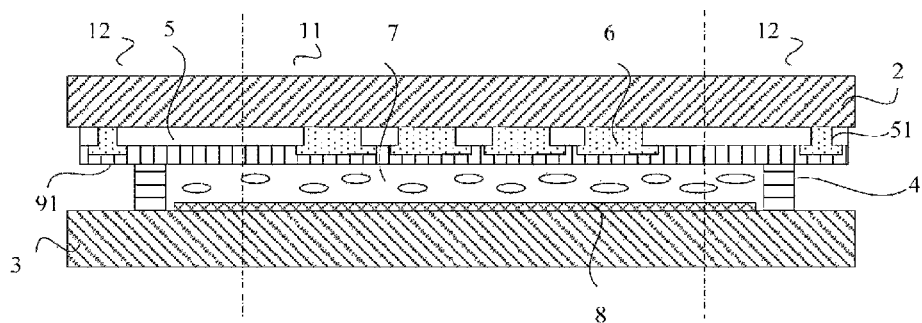
FIG. 2 is a sectional schematic diagram of a second display panel according to an embodiment of the present disclosure.
Figure 3:
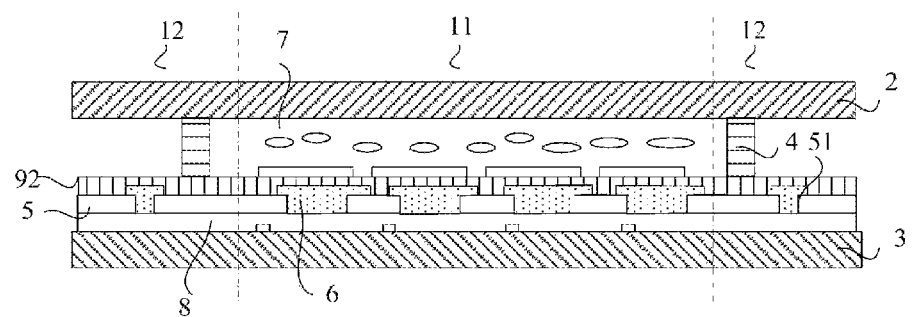
FIG. 3 is a sectional schematic diagram of a third display panel according to an embodiment of the present disclosure.

As shown in FIGS. 1, 2 and 3, the present disclosure provides a display panel, where the display panel is divided into a display area 11 and a peripheral area 12 surrounding the display area 11, and the display panel includes: a first substrate 2 and a second substrate 3 connected by a sealant 4, where the sealant 4 is in the peripheral area 12; a black matrix layer 5 located between the first substrate 2 and the second substrate 3, where a part of the black matrix layer 5 in the peripheral area 12 is provided with an opening 51 for blocking static electricity, and the opening 51 is located at the outer side of the sealant 4.

In the display panel according to the present disclosure, since the part of the black matrix layer 5 in the peripheral area 12 is provided with the opening 51 for blocking static electricity, external static electricity can be weakened through the opening 51 of the black matrix layer 5, so that the static electricity cannot enter the display area 11 of the display panel.

The edge of the part of the black matrix layer in the peripheral area is located between the sealant and the edge of the first substrate; or the edge of the part of the black matrix layer in the peripheral area is located between the sealant and the edge of the second substrate.

Therefore, the display panel according to the present disclosure can reduce the static electricity entering the inside of the display panel, and lower the occurrence rate of undesirable static electricity of the display panel.

The first substrate 2 and the second substrate 3 may be provided with a first planarization layer 91 and a second planarization layer 92 respectively. Therefore, the above opening 51 can be filled with the first planarization layer 91 or the second planarization layer 92, and as shown in FIG. 1, the opening 51 is filled with the first planarization layer 91.

Further, the above display panel further includes a color filter layer 6 at least filled in a light transmitting area of the black matrix layer 5 in the display area 11. The setting of the color filter layer 6 can enable the display panel to realize color display. The above filter color layer 6 can include three colors of RGB, and can also include four colors of RGBW.

In order to prevent light leakage of the display panel at the opening 51, the above opening 51 is filled with a color filter layer 6. During preparation, the color filter layer 6 can directly extend to the upper side of the opening 51, so the preparation process is simple. The filled color filter layer can be a blue filter layer.

Of course, the opening 51 can also be filled with other materials, such as light shading materials, etc. In one optional embodiment according to the present disclosure, the opening 51 is filled with insulating materials. The insulating materials can improve the effect of the opening 51 in blocking static electricity.

The specific shapes and the specific positions of the opening 51 according to the present disclosure can be set in many ways. The opening 51 can be arranged on the whole periphery of the sealant 4, or the opening 51 can be arranged on part of the area of the periphery of the sealant 4, and the size of the opening 51 can be set according to actual needs.

Figure 4:
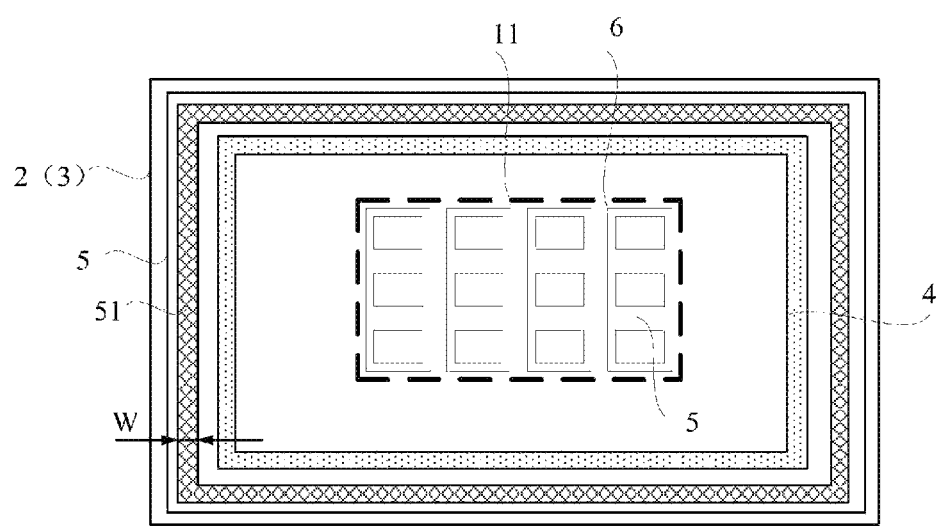
FIG. 4 is a schematic diagram of a first structure of the opening on the black matrix layer according to an embodiment of the present disclosure.

As shown in FIG. 4, in one optional embodiment according to the present disclosure, the opening 51 includes an annular opening arranged to surround the sealant 4. The annular opening is set to enable the display panel to block static electricity in the whole peripheral direction.

Figure 5:
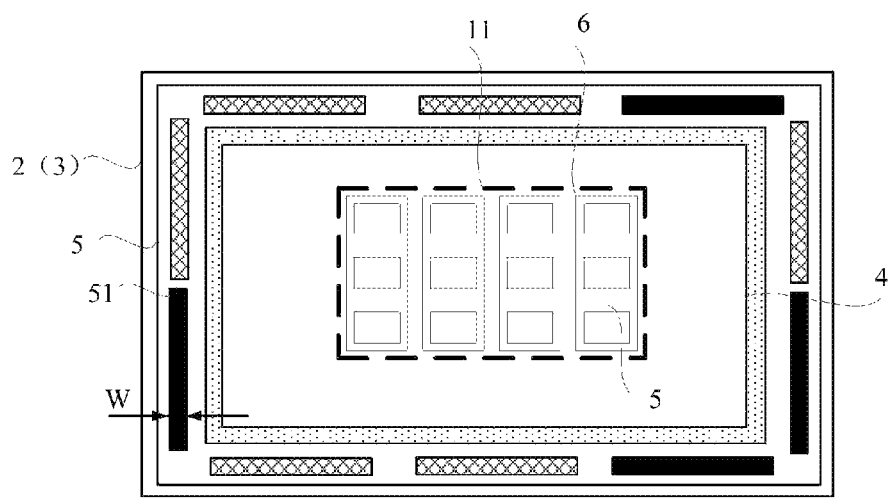
FIG. 5 is a schematic diagram of a second structure of the opening on the black matrix layer according to an embodiment of the present disclosure.

As shown in FIG. 5, in another optional embodiment according to the present disclosure, the opening 51 includes multiple sub-openings which are distributed at intervals along the periphery of the sealant 4.

Figure 6:
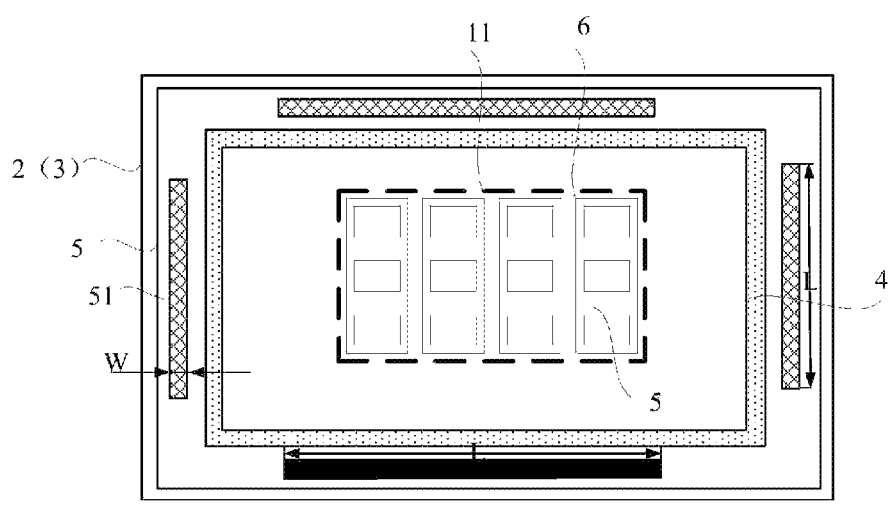
FIG. 6 is a schematic diagram of a third structure of the opening on the black matrix layer according to an embodiment of the present disclosure.

As shown in FIG. 6, in still another optional embodiment according to the present disclosure, the opening 51 includes strip-shaped openings arranged at each side of the sealant 4, and the length L of each strip-shaped opening is greater than or equal to one half of a side length of the display panel at a side where the strip-shaped opening is located.

The width W of the opening 51 is greater than or equal to 100 microns, such that the opening 51 can play a better role in blocking the static electricity from entering the display area 11. Specifically, the width of the opening 51 can be 105 microns, 110 microns, 120 microns, 125 microns, 130 microns, or 150 microns, etc., and the other widths will not be repeated redundantly herein.

As shown in FIG. 1 and FIG. 2, the above display panel further includes a liquid crystal layer 7, where the black matrix layer 5 is arranged on the first substrate 2, the second substrate 3 is an array substrate, and the liquid crystal layer 7 is arranged between the black matrix layer 5 and the array substrate.

As shown in FIG. 3, the above display panel further includes a liquid crystal layer 7, where the second substrate 3 is provided with an array layer 8, the black matrix layer 5 is arranged on the array layer 8, and the liquid crystal layer 7 is arranged between the black matrix layer 5 and the first substrate 2.

The above array layer 8 includes a passivation layer, a pixel electrode layer, a common electrode layer, a gate line, a data line, etc. The above display panel further includes film layers such as an alignment film of the second planarization layer 92, and these will not be repeated redundantly herein.

The display panel according to the present disclosure can in a TN (Twisted Nematic) mode, an IPS (In-Plane Switching) mode, an FFS (Fringe Field Switching) mode or a VA (Vertical Arrangement) mode.

The present disclosure further provides a display device which includes the display panel according to any one of the above embodiments, since the above display panel can reduce the static electricity entering the inside of the display panel, and lower the occurrence rate of undesirable static electricity of the display panel, therefore, the display device according to the present disclosure has a favorable display effect.

In the present embodiment, the display device can also include a circuit board, a drive circuit and other components. For the other components of the display device which are not described in detail in the present embodiment, please refer to the prior art, and these components will not be repeated redundantly herein. The specific types of the display device are not limited, for example, the display device can be a liquid crystal display, a tablet computer, a mobile phone, an electronic book, a liquid crystal television, etc.

Evidently, those skilled in the art can make various modifications and variations to the present disclosure without departing from the spirit and scope of the present disclosure. Accordingly the present disclosure is also intended to encompass these modifications and variations thereto so long as the modifications and variations come into the scope of the claims appended to the present disclosure and their equivalents.

The invention claimed is:

1. A display panel, wherein the display panel is divided into a display area and a peripheral area surrounding the display area, and the display panel comprises:
  a first substrate and a second substrate connected by a sealant, wherein the sealant is in the peripheral area; and
  a black matrix layer located between the first substrate and the second substrate, wherein a part of the black matrix layer in the peripheral area is provided with an opening for blocking static electricity, the opening is located at an outer side of the sealant, and the opening comprises an annular opening arranged to surround the sealant.

2. The display panel according to claim 1, wherein the opening is filled with a color filter layer.

3. The display panel according to claim 1, wherein the opening is filled with insulating materials.

4. The display panel according to claim 1, wherein the opening comprises multiple sub-openings which are distributed at intervals along a periphery of the sealant.

5. The display panel according to claim 1, wherein the opening comprises strip-shaped openings arranged at each side of the sealant, and a length of each strip-shaped opening is greater than or equal to one half of a side length of the display panel at a side where the strip-shaped opening is located.

6. The display panel according to claim 1, wherein a width of the opening is greater than or equal to 100 microns.

7. The display panel according to claim 1, further comprising a liquid crystal layer, wherein the black matrix layer is arranged on the first substrate, the second substrate is an array substrate, and the liquid crystal layer is arranged between the black matrix layer and the array substrate.

8. The display panel according to claim 1, further comprising a liquid crystal layer, wherein the second substrate is provided with an array layer, the black matrix layer is arranged on the array layer, and the liquid crystal layer is arranged between the black matrix layer and the first substrate.

9. A display device, comprising a display panel, wherein the display panel is divided into a display area and a peripheral area surrounding the display area, and the display panel comprises:

a first substrate and a second substrate connected by a sealant, wherein the sealant is in the peripheral area; and a black matrix layer located between the first substrate and the second substrate, wherein a part of the black matrix layer in the peripheral area is provided with an opening for blocking static electricity, the opening is located at an outer side of the sealant, and the opening comprises annular opening arranged to surround the sealant.

10. The display device according to claim 9, wherein the opening is filled with a color filter layer.

11. The display device according to claim 9, wherein the opening is filled with insulating materials.

12. The display device according to claim 9, wherein the opening comprises multiple sub-openings which are distributed at intervals along a periphery of the sealant.

13. The display device according to claim 9, wherein the opening comprises strip-shaped openings arranged at each side of the sealant, and a length of each strip-shaped opening is greater than or equal to one half of a side length of the display panel at a side where the strip-shaped opening is located.

14. The display device according to claim 9, wherein a width of the opening is greater than or equal to 100 microns.

15. The display device according to claim 9, wherein the display panel further comprises a liquid crystal layer, wherein the black matrix layer is arranged on the first substrate, the second substrate is an array substrate, and the liquid crystal layer is arranged between the black matrix layer and the array substrate.

16. The display device according to claim 9, wherein the display panel further comprises a liquid crystal layer, wherein the second substrate is provided with an array layer, the black matrix layer is arranged on the array layer, and the liquid crystal layer is arranged between the black matrix layer and the first substrate.

\* \* \* \* \*